United States Patent [19]
George

[11] Patent Number: 5,497,055
[45] Date of Patent: Mar. 5, 1996

[54] PARABOLIC SIGNAL TIMING LOOP

[75] Inventor: John B. George, Carmel, Ind.

[73] Assignee: Thomson Consumer Electronics, Inc., Indianapolis, Ind.

[21] Appl. No.: 351,906

[22] Filed: Dec. 8, 1994

[30] Foreign Application Priority Data

Mar. 24, 1994 [GB] United Kingdom ............... 9405799

[51] Int. Cl.⁶ .............................. G09G 1/04; H01J 29/70; H04N 3/23
[52] U.S. Cl. ...................... 315/371; 315/389; 348/746; 348/806
[58] Field of Search ..................... 315/371, 389; 348/746, 806

[56] References Cited

U.S. PATENT DOCUMENTS

| | | | |
|---|---|---|---|
| 3,543,080 | 11/1970 | Wuensch | 315/371 |
| 4,560,910 | 12/1985 | Midland | 315/382 |
| 4,623,825 | 11/1986 | Wahlquist et al. | 315/368 |
| 4,733,140 | 3/1988 | Oliver | 315/371 |
| 4,816,908 | 3/1989 | Colineau et al. | 358/60 |
| 4,927,219 | 5/1990 | Golik | 315/371 |
| 4,968,920 | 11/1990 | Hartmann et al. | 315/371 |
| 4,972,127 | 11/1990 | Rodriguez-Cavazos et al. | 315/371 |
| 5,034,664 | 7/1991 | Fernsler et al. | 315/370 |
| 5,166,576 | 11/1992 | Roussel et al. | 313/431 |
| 5,179,319 | 1/1993 | Iwasaki et al. | 313/440 |
| 5,218,275 | 6/1993 | Truskalo | 315/368.21 |
| 5,282,033 | 1/1994 | Gleim et al. | 358/139 |

OTHER PUBLICATIONS

Application Ser. No. 08/287,695, filed Aug. 9, 1994, Art Group 2602, *Projection Television Apparatus*, Examiner: N. West.

Primary Examiner—Gregory C. Issing
Attorney, Agent, or Firm—Joseph S. Tripoli; Joseph J. Laks; Francis A. Davenport

[57] ABSTRACT

A deflection waveform correction signal generator comprises a multiplying circuit for generating a pincushion correction signal. A horizontal frequency ramp is generated by a clipped retrace pulse. The ramp generator has an output coupled to an integrating circuit for generating a parabolic shaped signal. The ramp generator and ramp integrator are reset at a horizontal rate by reset pulses of differing duration. The different duration of reset pulses results in the parabolic signal having regions of non-parabolic shape. The parabolic shaped signal is coupled to an input of the multiplying circuit. A control circuit is coupled to the parabolic shaped signal for maintaining a peak amplitude thereof by controllable coupling to the ramp generator. A control loop is coupled to the integrator for controlling an integrator input bias current to generate the parabolic shaped signal at a predetermined time interval.

18 Claims, 5 Drawing Sheets

PARABOLIC SIGNAL TIMING LOOP

This invention relates to the field of video display, and in particular to the generation of deflection waveform correction signals for cathode ray tube displays.

BACKGROUND OF THE INVENTION

In a projection type video display, the usual geometrical raster distortions associated with a cathode ray tube display may be exacerbated by the use of a curved face plate CRT and the inherent magnification in the optical projection path. The use of a curved face plate CRT may offer benefits in a reduction of projection path length, and may also enable optical imaging simplification. However, the tube deflection may require the generation of specially shaped, highly stable, correction waveforms in order to achieve more stringent convergence requirements imposed by large screen viewing.

SUMMARY OF THE INVENTION

A correction waveform signal generator comprising an integrator, having an input and generating a generally parabolically shaped deflection correction waveform. A deflection rate ramp generator is coupled to the integrator input to generate the generally parabolically shaped waveform. A DC signal is coupled to the integrator input to thereby determine a timing of a maximum value of the generally parabolically shaped waveform relative to a period of the deflection rate. Means for measuring the timing of the generally parabolically shaped waveform, to generate the DC signal for controlling the timing, thereby maintaining a predetermined timing.

DETAILED DESCRIPTION

Figure 1B:
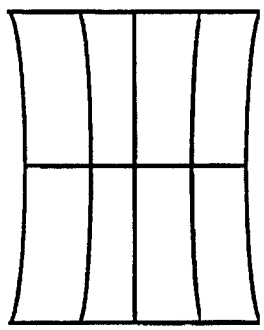
FIG. 1 is a simplified block diagram of a CRT projection display including inventive features and rasters depicting various geometrical distortions.
Figure 1C:
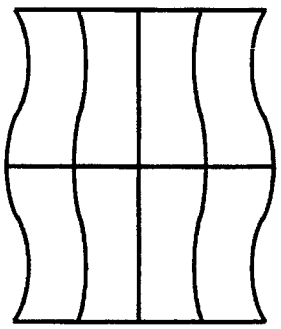
Figure 1D:
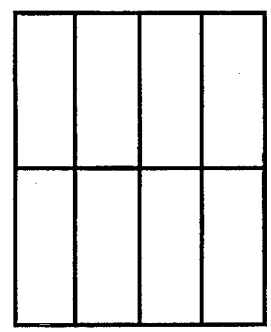
Figure 1E:
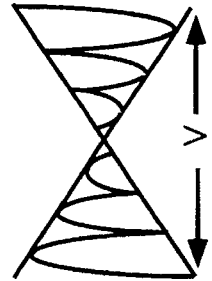
Figure 1A:
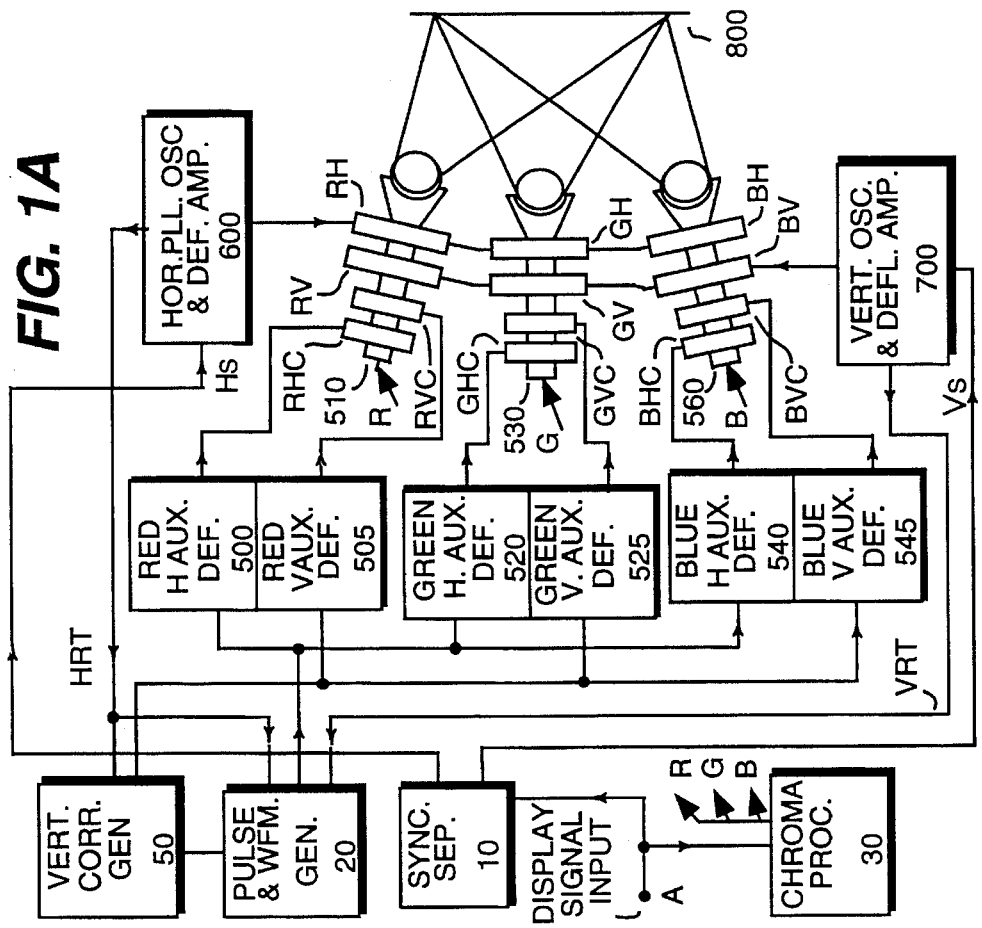
Figure 5:
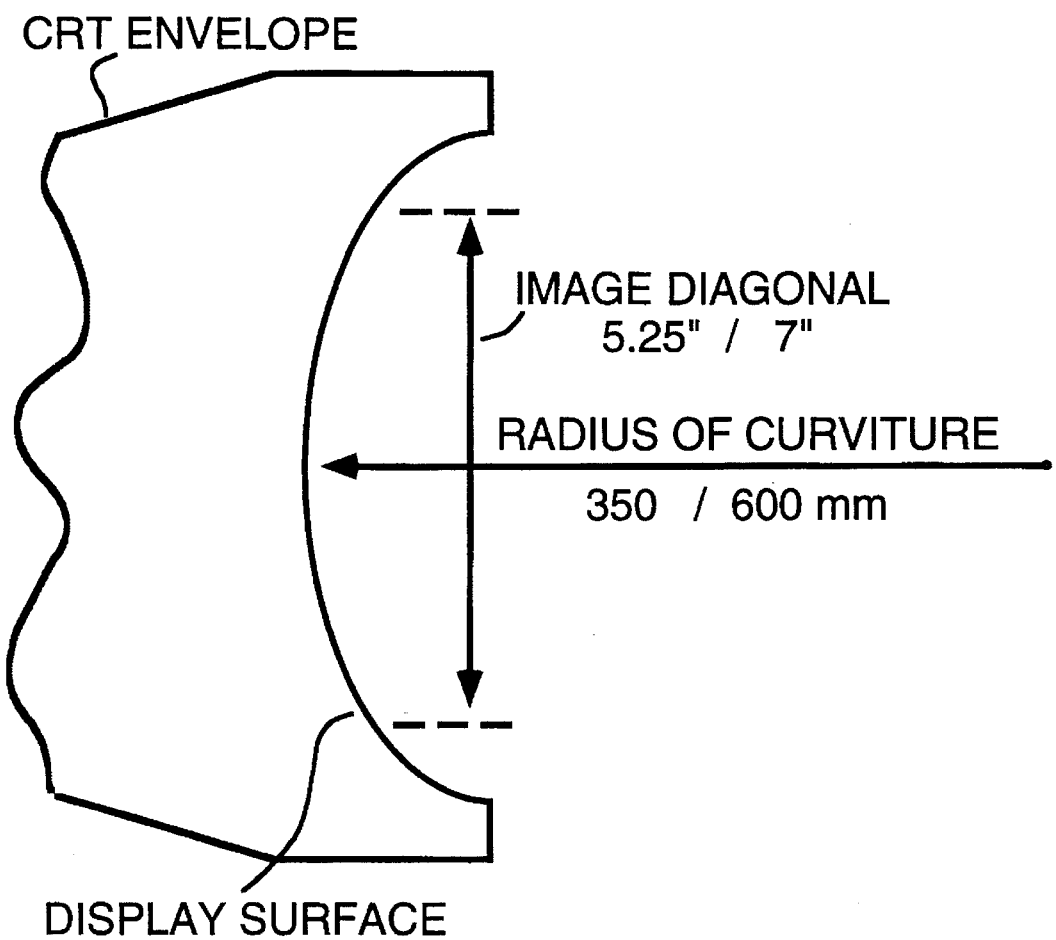
FIG. 5 illustrates a concave, curved face plate of a CRT.

A video display employing cathode ray tube projection is illustrated in FIG. 1(A). Three cathode ray tubes are mechanically arranged, and optically coupled, to project images from CRT phosphor display surfaces to form a single raster on a screen. Each CRT displays an essentially monochromatic color raster appropriate to the color signal coupled thereto. The color signals are derived from a display signal input signal. The center CRT, for example, displaying a green raster, may be positioned such that the raster center is orthogonal to the screen. The two other tubes are symmetrically displaced from the center tube position and consequently only the vertical part of their raster is projected orthogonally onto the screen. Thus, in the highly simplified arrangement of FIG. 1(A), the outer displayed rasters will suffer a trapezoidal geometrical distortion in addition to other geometrical distortions resulting from electron beam scanning. The cathode ray tubes shown in FIG. 1(A) and FIG. 5, have a curved, concave spherical phosphor display surface. FIG. 5 depicts in profile, a front section of a CRT having a concave spherical display surface, and indicates the radius of curvature and display image diagonals for two tube sizes. Curved face plate cathode ray tubes are manufactured, for example, by MATSUSHITA, as type P16LET07(RJA) red channel, P16LET07HKA) green channel, P16LET07(BMB) blue channel. Thus, the projected image, composed of the three rasters in register on the screen, requires corrective deflection waveforms to compensate for geometrical distortions resulting from the combination of electron beam deflection, tube face plate shape and optical display path.

Various forms of geometrical distortion result from electron beam scanning. For example, FIG. 1(B) illustrates geometrical distortion in the vertical scanning direction known as North-South pincushion distortion. With this form of distortion the vertical scanning speed may be considered to be modulated, producing incorrect positioning, bowing or sagging, of the horizontal line scan structure as shown in FIG. 1(B). A similar distortion of the horizontal line scan structure is illustrated FIG. 1(C) where the line placement is bowed at a multiple of horizontal scanning rate. This form of distortion is termed gullwing distortion. The desired result of deflection waveform correction is illustrated in FIG. 1(D) which represents the displayed. registered, combination of the three colored rasters. In FIG. 1(D) the vertical position of the horizontal scan lines of each raster have been corrected such that they are nominally parallel, one with the other, and any differential placement errors have been minimized to largely eliminate the formation of spurious colored edges or convergence errors. North South pincushion correction conventionally utilizes a horizontal rate parabola which is modulated with a vertical rate ramp signal. This form of modulated waveshape usually provides adequate correction of vertical pincushion errors. However, the use of concave face cathode ray tubes in conjunction with the projection optics introduces raster edge line placement errors which are not fully corrected by the conventional modulated parabolic signal. Thus the parabolic waveshape is advantageously shaped to produce the desired corrective effect at the edge of the raster. In addition the shaped parabolic waveform is inventively horizontally phased to compensate for delay, or horizontal phase shift, resulting from low pass filtering effects produced by the combination of slew rate limitation in the auxiliary deflection amplifier and inductance of the auxiliary deflection coil.

The various methods for reducing displayed geometrical and convergence errors are of limited value unless the resultant correction is stable with temperature variation, and is insensitive to power supply and beam current loading effects.

In FIG. 1(A) video signal is input at terminal A and is coupled to a chroma processor 30, which extracts from the signal, color components, for example, red green and blue for display on cathode ray tubes 510, 530, 560. The three cathode ray tube displays are optically projected to form a single image on screen 800. The video signal at terminal A is also coupled to a synchronizing pulse separator 10, which derives horizontal HS, and vertical rate sync pulses VS, from the signal. The separated horizontal sync pulses HS are coupled to a phase locked loop horizontal oscillator and deflection amplifier 600. Separated vertical sync pulses VS, are coupled to a vertical oscillator and deflection amplifier 700. The horizontal PLL oscillator and deflection amplifier 600 is coupled to three horizontal deflection coils, RH, GH, BH, which are connected in parallel. Coil RH represents the red horizontal deflection coil, and coils GH and GB represent the green and blue horizontal deflection coils respectively. Similarly, the vertical oscillator and deflection amplifier 700 is coupled to three vertical deflection coils connected in series, where RV represents the red vertical coil, GV and BV the green and blue coils respectively.

Deflection waveform correction is provided by corrective currents coupled to individual horizontal and vertical auxiliary deflection coils positioned, for example, on each tube neck. Auxiliary deflection coils RHC and RVC, deflecting in the horizontal and vertical directions respectively, are positioned on the red CRT neck. Similarly, auxiliary deflection coils GHC and GVC, and BHC and BVC, green and blue respectively, are located on the green and blue CRT necks. The auxiliary deflection coils are driven by auxiliary horizontal and vertical deflection amplifiers 500/505, 520/525, and 540/545 which represent the red, green and blue channels respectively. The red horizontal auxiliary deflection amplifier 500, comprises a summer/driver amplifier which develops a composite correction signal which is coupled to the horizontal auxiliary deflection coil RHC. Similarly, for the red vertical auxiliary deflection amplifier 505, and likewise for the green and blue channels. The composite correction signal is developed by summation of a selection of signals having particular waveform shapes and individual amplitude control. Horizontal correction signals which are generated by circuitry within a pulse and waveform generator 20, and are coupled to the red, green and blue horizontal correction summing amplifiers, 500, 520 and 540. An inventive vertical correction signal generator 50, shown in greater detail in FIG. 2, generates a correction signal which is coupled to the red, green and blue vertical correction summing amplifiers, 505, 525 and 545. The vertical correction signal generator 50 receives a horizontal retrace signal input HRT, from the horizontal oscillator and deflection amplifier 600, and a vertical rate sawtooth signal from the pulse and waveform generator 20. The pulse and waveform generator 20 receives a vertical rate pulse VRT, from the vertical oscillator and amplifier 700 and the horizontal retrace pulse HRT from the horizontal deflection amplifier 600. In addition to generating deflection drive signals, the pulse and waveform generator produces various deflection waveform correction signals with the exception of North/South pincushion correction.

Figure 2:
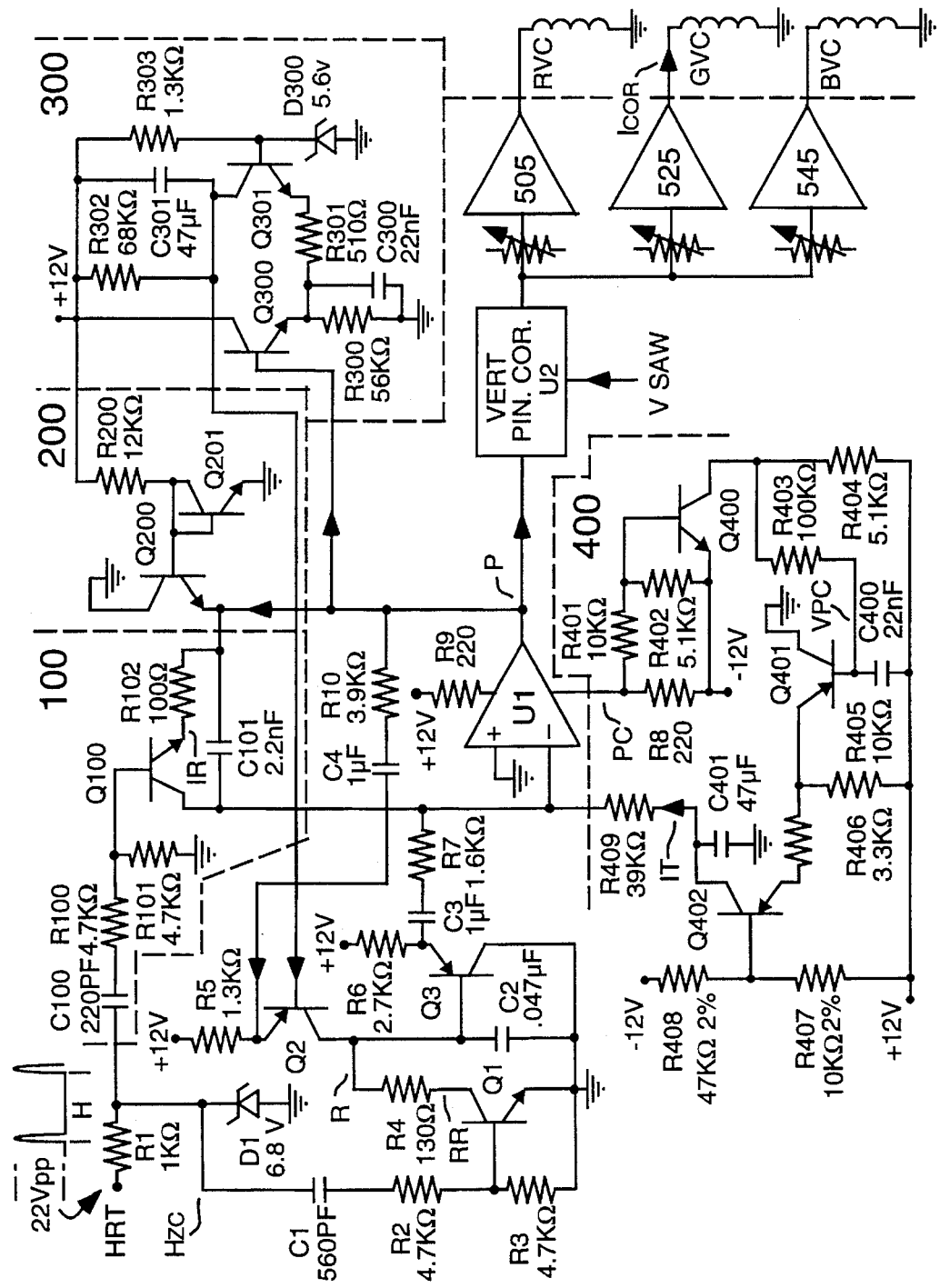
FIG. 2 is a simplified schematic drawing showing inventive features of FIG. 1.

The vertical correction signal generator 50 is shown in detail in FIG. 2. The horizontal retrace pulse signal HRT. is used to generate a horizontal rate ramp signal which is integrated to form a horizontal rate, generally parabolically shaped signal. The parabolic signal is applied to a modulating circuit which is modulated by a vertical rate ramp signal. The modulating circuit generates a modulated signal comprising the parabolic shaped signal which is amplitude modulated responsive to the vertical rate ramp signal. The vertical ramp modulates the parabolic signal, linearly reducing the amplitude to zero at the center of the field period at which point the polarity is inverted and the parabolic signal is linearly increased, achieving full amplitude at the end of the field. The modulated correction signal, depicted in FIG. 1(E) at vertical rate, is coupled to the auxiliary deflection amplifiers 505, 525, 545, to produce a North South pincushion corrective current in the auxiliary deflection coils RVC, GVC, BVC, respectively.

A horizontal retrace pulse signal HRT is coupled via a resistor R1 to the cathode of zener diode clipper D1 which advantageously generates a clipped pulse HZC. The horizontal retrace pulse HRT has a nominally 22 volt peak amplitude, however the shape and horizontal phasing of the peak pulse amplitude may be modulated by the video content of the displayed image, as illustrated in waveform B of FIG. 4. Such retrace pulse modulation may result in spurious, unwanted horizontal phase modulation of correction signals relative to the horizontal deflection. The advantageous zener diode clipper is selected to have a breakdown voltage which corresponds to the retrace pulse amplitude value at which the horizontal PLL oscillator is synchronized. Since clipped pulse HZC, and the derived correction waveforms, are derived from the same retrace pulse amplitude value as the horizontal PLL, unwanted phase modulation between deflection and correction signals can be essentially eliminated ensuring that both deflection and correction waveforms track together. The horizontal PLL is synchronized at a retrace pulse amplitude of nominally 6.8 volts, hence clipping zener diode D1 is selected to have a 6.8 volt break down voltage. Thus the nominally 22 volt retrace pulse HRT containing power supply loading and video dependent amplitude and pulse shape variations are advantageously eliminated by the clipping action of zener diode D1. The zener diode produces a nominal pulse amplitude of 7.4 volts peak to peak, which represents +6.8 volts plus −0.7 volt reverse conduction. The advantageous use of zener diode clipper D1, largely removes video signal and beam current related variations of retrace pulse shape and amplitude. Thus undesirable horizontal phase modulation of the correction waveform is largely eliminated. A further advantage arising from zener clipping of retrace pulse HRT prior to differentiation is the generation of accurate, stable reset pulse widths, independent of retrace pulse shape, rise time or amplitude. Reset pulses are generated from the same polarity of differentiated pulse edge. Furthermore the reset pulse may have a duration, or width, greater than half the duration of retrace pulse HRT, which is not possible if the reset pulse is differentiated without clipping.

The clipped retrace pulse HZC, at the cathode of diode D1 is coupled to a series network comprising a capacitor C1 which is connected to a pair of series connected resistors R2 and R3. Resistor R3 is connected to ground and the junction of the resistors is connected to the base of a transistor Q1. The time constant of the series connected network is such that the clipped retrace pulse is differentiated and applied to the base of transistor Q1. The emitter terminal of transistor Q1 is connected to ground and the collector terminal is connected to a capacitor C2 via a resistor R4. The emitter terminal of transistor Q2 is connected to a +12 volt supply via a resistor R5 and the collector is connected to the junction of capacitor C2, resistor R4 and the base of a transistor Q3. Transistor Q3 functions as an emitter follower with the collector terminal connected to ground and the emitter terminal connected to the +12 volt supply via a resistor R6. Transistor Q2 is a constant current source where the current magnitude is controlled by signals coupled to the emitter and base terminals. The collector current of transistor Q2 charges capacitor C2 towards +12 volt generating a nominally linear ramp of increasing voltage. The differentiated positive edge of the clipped retrace pulse is applied to the base of transistor Q1 causing it to saturate for approximately 8 microseconds. Thus the ramp voltage, formed across capacitor C2, is discharged via transistor Q1 and resistor R4. The discharge time constant of ramp forming capacitor C2 is largely determined by resistor R4, which is selected to generate an exponentially shaped voltage discharge ramp. The horizontal rate, shaped ramp signal is coupled, via emitter follower Q3, to series connected capacitor C3 and resistor R7 which are coupled to an inverting input of an integrating amplifier U1. Amplifier U1 is powered from the +12 volt supply via a resistor R9, and from the −12 volt supply via a resistor RS. The non-inverting input of amplifier U1 is grounded.

Circuit 100 is an advantageous horizontal rate integrator and reset pulse generator. The clipped retrace pulse HZC is also coupled to a series connected network comprising a capacitor C100 which is connected to a series connected pair of resistors R100 and R101. Resistor R101 is connected to ground and the junction of the resistors is connected to the base of a transistor Q100. The time constant of the series connected network differentiates the clipped retrace pulse, with the positive edge causing transistor Q100 to saturate for 5 microseconds generating integrator reset pulse IR. The emitter terminal of transistor Q100 is connected to a resistor R102 which is connected to the output of U1, and the collector terminal is connected to the inverting input of U1. Thus transistor Q100 discharges or resets, via resistor R102, the integrating capacitor C2 of the integrator formed by I.C. U1. Since the discharge time constant of resistor R102 and integrating capacitor C101 is short, approximately 0.5 microseconds, integrator capacitor C101 is rapidly discharged and held reset for the remainder of the conduction period.

The ramp signal is coupled via capacitor C3 and resistor R7, to the inverting input of amplifier U1. The output terminal of amplifier U1 is coupled, via integrating capacitor C101, back to the inverting input thus causing the ramp signal be integrated, and generating a generally parabolic shaped output signal P. The output signal P, of integrator U1 is connected to a clipper or active clamp advantageously formed by circuit 200. Parabolic correction signal P is connected to an emitter terminal of a transistor Q200. The collector of transistor Q200 is connected to ground and the base is connected to the base of a transistor Q201. The base and collector terminals of a transistor Q201 are connected together and the emitter is connected to ground. Thus transistor Q201 functions as a forward biased voltage reference diode which accurately determines the Vbe of clipper transistor Q200. The junction of the base and collector terminals of transistor Q201 are coupled to the +12 volt supply via a resistor R200, which limits the collector current to approximately 1 milliamp. The current gain of transistor Q201, for example 100, establishes a base current of about microamps. The connection of transistor Q201 base and collector terminals results in feedback which generates a base/collector to emitter potential of approximately 0.5 volts, set by the base current of 10 microamps. The 0.5 volt developed across transistor Q201 is applied to the base of transistor Q200 and thus establishes a temperature stable clamping potential at the transistor Q200 emitter.

The output terminal of amplifier U1, for example IC type TLO82, is connected to the emitter of transistor Q200. Amplifier U1 has an internal current limitation of approximately ±25 milliamps, hence this determines the maximum current which may be conducted by transistor Q200 during clamping. Transistor Q200 has a current gain of, for example 100, thus during clamping a base current of approximately 250 microamps results, with a Vbe of approximately 0.6 volts. Since the base to emitter voltages of transistors Q200 and Q201 are tied together and track with temperature, a clamping potential of approximately −100 millivolts is established at transistor Q200 emitter. Thus negative signal excursions at the output terminal of integrator U1 are limited by the clamping action of transistor Q200 emitter to approximately −100 millivolts.

The parabolic shaped signal output P, of integrator U1 is also connected via series connected resistor R10 and capacitor C4 to the emitter of transistor Q2 to advantageously provide modulation of the ramp forming current generated at the collector. The parabolic shaped modulation current, injected at the emitter of transistor Q2 causes the ramp slope to be reduced at the beginning and end. Thus when the ramp is integrated by integrator U1, a modified parabolic shape results which is required for gullwing distortion correction. It was discovered that, unlike previous sources of gullwing deflection distortion, the particular gullwing errors resulting from the use of curved or concave face plate tubes required gullwing correction having an opposite polarity to that previously employed.

The parabolic shaped output signal P, from integrator U1 is also coupled to an advantageous amplitude control circuit 300. Control circuit 300 compares the amplitude of parabola P against a zener diode derived reference voltage and generates an output voltage which is applied to the ramp current source generator to form a negative feedback control loop. Thus advantageous amplitude control circuit 300 provides a control loop which may correct for amplitude variations resulting during horizontal ramp and parabolic signal generation. The parabolic shaped signal P is coupled to the base of a transistor Q300 which is arranged with a transistor Q301 as an emitter coupled or differential amplifier. The emitter terminal of transistor Q300 is connected to ground via a parallel combination of a resistor R300 and a capacitor C300. The emitter of transistor Q300 is also connected to an emitter terminal of transistor Q301 via a resistor R301 which provides gain degeneration and aids control loop stabilization. The base terminal of transistor Q301 is connected to a DC reference potential generated at the junction of a zener diode D300 and a resistor R303. Resistor R303 is connected between the +12 volt supply and the cathode of a zener diode D300, the anode of which is connected to ground. Zener diode D300 has a breakdown voltage of 5.6 volts which is applied to the base of transistor Q301 and results in approximately 5 volts appearing across capacitor C300. It is desirable that signal P be generated with a maximal amplitude. However, too larger parabolic signal amplitude may cause transistor Q100 to breakdown and clip signal P. Thus a maximum amplitude of 5.6 volts is selected to avoid break over effects in transistor Q100. The collector of transistor Q301 is connected to a parallel combination of a resistor R302 and a capacitor C301 which are connected to the +12 volt supply. Resistor R302 and capacitor C301 form a low pass filter which smoothes the horizontal rate current pulses and generates a control voltage which is coupled to the base of transistor Q2 to control the amplitude of the modulated current source. The parabolic shaped signal P, coupled to the base of transistor Q300 causes current flow when the parabolic waveform peak exceeds the voltage across capacitor C300 plus the Vbe potential of transistor Q300. Thus parabolic waveform peaks greater than nominally 5.6 volts cause the voltage across capacitor C300 to increase. The increased voltage across capacitor C300 results in a decrease in the Vbe potential of transistor Q301 which reduces the collector current flow. Hence the voltage developed or dropped, across resistor R302 and capacitor C301 and coupled to transistor Q2 base, is reduced. Thus, the current in ramp forming transistor Q2 is controllably reduced, reducing the ramp amplitude and restoring the amplitude of parabolic signal P to 5.6 volts. Inventive amplitude control loop 300 includes the ramp and parabola generators and maintains the peak amplitude of the parabolic shaped signal P equal to the voltage across diode D300. Thus the amplitude of correction signal P is maintained essentially constant and independent of power supply and component variations.

An inventive pulse width control circuit 400, generates a direct current which is coupled to the inverting input U1.

Integration of this DC by I.C. U1 results in a horizontal rate, tilt or ramp component being added to the horizontal rate parabolic signal P. The inverting input of integrating amplifier U1 is connected via a resistor R409 to an inventive pulse width control circuit 400. The direct current coupled via resistor R409 is derived from measurement of a pulse width with reference to a divided potential derived from the positive and negative 12 volt power supplies. As described for advantageous circuit 200, negative excursions of the parabolic signal P are clamped to −100 millivolts by circuit 200. The clamping action circuit 200 sinks current from the output circuitry of amplifier U1, resulting in current limitation due to the current limiter within I.C. U1. The output circuitry of I.C. U1 remains in the current limited condition for the duration of the clamped negative signal excursion. The current limiting condition within amplifier U1 may be observed by monitoring the current sourced by the −12 volt supply: For example, at the onset of clipping the current will increase to the limiting value and remain there for the duration of clipping. Since the −12 volt supply is coupled via a resistor R8, the supply current step to the limitation value will result in a voltage step or pulse, due to the voltage drop across supply resistor RS. Thus current limitation in I.C. U1 generates a positive pulse PC, at the junction of resistor R8 and I.C. U1, having a duration equal to the duration of the clamping action of circuit 200. Pulse PC, is coupled to series connected resistors R401 and R402. Resistor R402 is connected to the −12 volt supply and the junction of the resistors forms a potential divider which is connected to the base terminal of a transistor Q400. Transistor Q400 functions as a saturating switch, with the emitter terminal connected to the −12 volt supply. The collector terminal of transistor Q400 is connected via a resistor R404 to the +12 volt supply. Transistor Q400 collector is also connected to a low pass filter formed by series connected resistor R403 and shunt connected capacitor C400. Capacitor C400 is connected to the +12 volt supply with the junction connected to the base terminal of an emitter coupled amplifier transistor Q401. The collector terminal of transistor Q401 is connected to ground and the emitter is connected to the +12 volt supply via a resistor R405. The emitter of Q401 is also coupled to the emitter terminal of a transistor Q402 via a resistor R406. Transistors Q401 and 402 may be considered as a differential amplifier with gain degeneration, or loop damping, resulting from resistor R406 in transistor Q402 emitter. The base of transistor Q402 is connected to the junction of resistors R407 and R408 which form a potential divider coupled between the positive and negative 12 volt supplies. Resistor R408 is connected to the −12 volt supply and resistor R407 is connected to the +12 volt supply. The collector terminal of transistor Q402 is decoupled to ground by a capacitor C401 and is connected to the inverting input of integrating amplifier U1 via a resistor R409.

The positive pulse PC, at resistor R8, is amplified and inverted by transistor Q400. The inverted collector pulse is low pass filtered, or integrated, by resistor R403 and capacitor C400 to produce a DC voltage VPC. The low passed DC voltage VPC, has an amplitude which varies in proportion to the width of pulse PC. Voltage VPC is coupled to the differential amplifier formed by transistors Q401 and Q402 where it is compared with a reference DC voltage generated by potential divider resistors R407 and R408. The potential divider is coupled between the supply voltages which power the integrator and allied circuitry, thus variations in either supply will result in a change to the reference potential and a compensating correction in pulse width. To improve the accuracy of pulse PC, resistors R407 and R408 have 2% resistance value tolerances. The potential divider generates a reference voltage equal to a ratio of 11/63.5 of the voltage existing between the positive and negative 12 volt supplies. The ratio of 11/63.5 represents the width, or duration, of pulse PC as a ratio of the horizontal period. Thus, variations of voltage VPC are compared with the reference voltage, which represents the desired pulse duration, and cause a corrective current to flow in transistor Q402. The corrective current IT, is coupled via resistor R409 to vary the bias current at the inverting input of amplifier U1. The integrated effect of the corrective DC bias current IT, introduced by resistor R408, is to cause the output signal of U1 to be superimposed on a shallow ramp having a slope proportional to the current IT. Thus parabolic signal P is tilted, causing the waveform cusps to have different DC potentials, with the result that negative parabolic signal excursions are clamped by circuit 200. The clamping action results in the generation of current limit pulse PC, having a width or duration which is controlled responsive to the corrective bias current IT. The inventive pulse width control circuit 400, forms a control loop which compensates for variations in, power supplies and the clamping voltage of circuit 200.

The shaped parabolic correction signal P, from integrator U1, is coupled to a balanced modulator I.C. U2 which generates a vertical rate pincushion correction signal. The modulated output signal from I.C. U2 is coupled via correction amplitude controls to auxiliary deflection amplifiers, 505, 525 and 545 and auxiliary vertical deflection coils RVC, GVC and BVC which correspond respectively to the red, green and blue colour projection tubes. Integrated circuit U2 generates suppressed carrier amplitude modulation of the horizontal rate parabolic signal with a vertical rate sawtooth signal to produce the modulated waveform, or bow tie signal, illustrated in waveform E of FIG. 1.

Figure 3A:
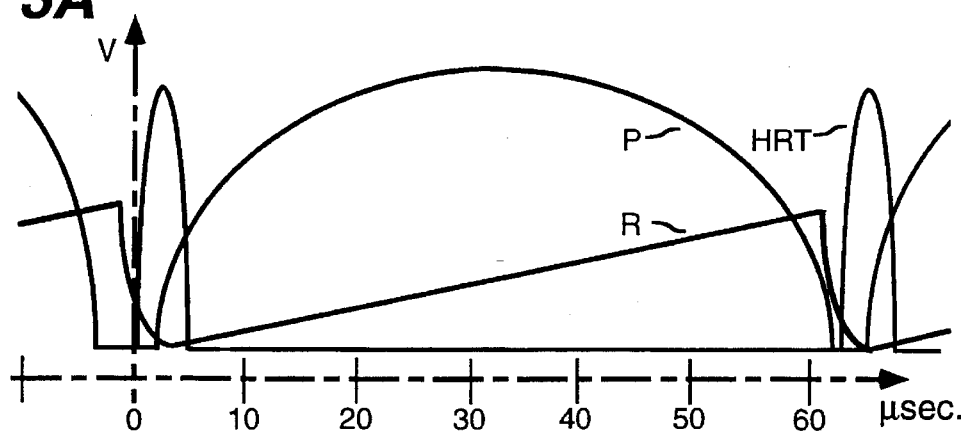
FIG. 3 depicts various inventive waveforms.
Figure 3B:
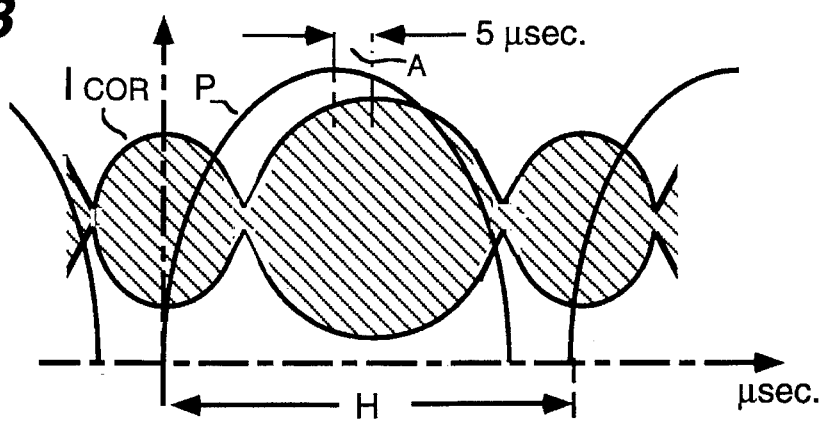

FIG. 3 (A) illustrates various waveforms and their timing relationships depicted during a horizontal interval and time referenced to the start of the horizontal retrace pulse HRT. The signal amplitudes in (A) are for illustrative purposes only. Retrace pulse HRT may be derived, for example, from a CRT heater winding on a horizontal deflection output transformer, and may have a pulse amplitude of approximately 22 volts. The pulse depicted in (A) has a nominal duration of approximately 12 microseconds and is illustrated without typical shape, width and rise time modulations resulting from various loading mechanisms. Waveform R represents the horizontal rate ramp R occurring at the collector of transistor Q2 of FIG. 2. Ramp R is depicted with a linear ramp up since gullwing corrective shaping is omitted for drawing clarity. However, the exponential reset period resulting from the action of discharge resistor R4 is shown. The shaped parabolic signal is depicted by waveform P, generated at the output of I.C. U1 in FIG. 2. The specific parabolic signal start and stop times are more accurately depicted in waveform (A) of FIG. 4. However, the advanced horizontal phase of parabolic signal P relative to horizontal retrace pulse HRT, illustrates the inventive phase advance required to compensate for delaying effects present in the correction signal path. Hence deflection correction is provided which is horizontally centered with respect to horizontal deflection.

Waveform (B) of FIG. 3, illustrates the modulated parabolic correction current ICOR, for example, in the green vertical correction coil GVC. Correction current ICOR is depicted centered in tile horizontal raster scan. When waveform ICOR is viewed at horizontal rate, as in (B), all vertical scan lines are superimposed, hence the vertical rate modulation applied to the parabolic signal. effectively fills in the waveform as depicted. Furthermore, waveform ICOR is depicted with two apparent parabolic signals of differing amplitudes, this depiction results from the use of suppressed carrier amplitude modulation of signal P by the vertical sawtooth. Shaped parabolic signal P is illustrated with a phase advance A, for example, 5 microseconds, required to horizontally center the corrective effect produced by the. auxiliary deflection/correction coil. The shaped parabolic correction signal is advanced in time as a result of the tilt component generated by the bias current introduced via resistor R409.

Figure 4A:
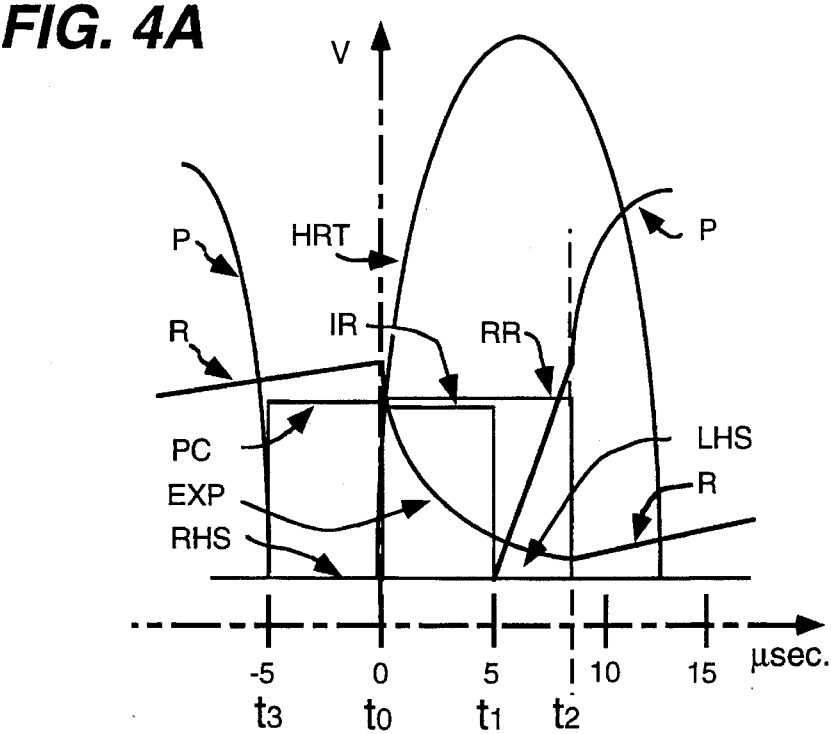
FIG. 4 depicts the inventive waveforms of FIG. 3 occurring about the horizontal blanking interval.
Figure 4B:
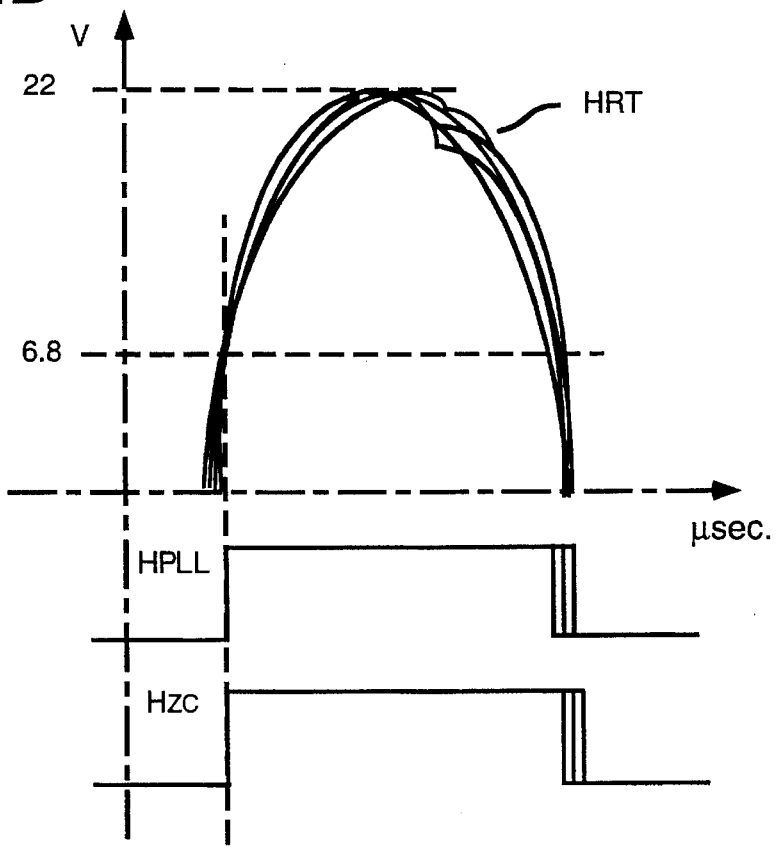

In FIG. 4, waveform (A) depicts the horizontal phasing of various waveforms utilized to generate the advantageous corrective waveform shape. Correction waveform P, although nominally parabolically shaped, comprises various additional waveshapes which provide specific correction at specific raster locations. Waveform (A) shows the phasing of the horizontal retrace pulse HRT at time 10, relative to various waveforms occurring during the display of left and right raster sides. At time RHS, t3–t0, the right hand side of the raster is displayed, and correction waveform P is shaped by the clamping action circuit 200. Advantageous clamp 200 clips the negative cusps or peaks which results in zero corrective waveform amplitude during time t3–t0, for example, 5 microseconds. The saturation, or current limit pulse PC is depicted occurring at time RHS, t3–t0. The falling edge of pulse PC is coincident with the start of the integrator reset pulse IR, since pulse IR ends the integration period and thus ends parabola generation. Any instability in horizontal timing of waveform P will be indicated by movement of the leading edge of pulse PC, which changes the pulse width. Although waveform P is reduced to zero at time RHS, during the right side of the raster is displayed, the actual modulated current ICOR, in the respective correction coils is not only delayed but also suffers a degradation in rise/fall times. Thus the apparent abrupt waveform discontinuity of signal P at time 13 is smoothed or flared towards a zero correction value. The horizontal phasing or starting point t1, of correction waveform generation is determined by the integrator reset pulse IR. When pulse IR ends at time t1, capacitor C101 is allowed to integrate and initiate generation of correction waveform signal P. At time LHS, t1–t2, the left hand side of the raster is displayed, and corrective waveform P is shaped by integration of the exponential shape EXP, occurring during times t1–12. The exponential shape is generated by the discharge of capacitor C2 via resistor R4. During time LHS, correction waveform P has a shape resulting from integration of the exponentially shaped discharge portion of ramp signal R. At time t2, ramp reset pulse RR ends, exponential discharge ceases, and linear ramp generation is initiated. Thus for trace time, between t2–t3, ramp R is integrated producing the parabolic shaped component of correction waveform P. After time 12, linear ramp R is generated with gull wing compensation, which following integration, produces the nominally parabolically shaped correction signal P.

The parabolic signal component of correction signal P provides north south pincushion correction when modulated by the vertical sawtooth. In addition to pincushion correction, the parabolic signal component is shaped to provide gull wing correction, and has further shaping or flaring to provide left and right raster edge correction. Hence the parabolically shaped correction signal, is generated with an advanced horizontal phase, comprising various regions, shaped to produce corrective effects at specific raster locations. Thus accurately defined and stably implemented deflection correction is provided for high quality image display.

What is claimed is:

1. A correction waveform signal generator, comprising:
   an integrator having an input and generating a generally parabolically shaped deflection correction waveform;
   a deflection rate ramp generator coupled to said integrator input to generate said generally parabolically shaped waveform;
   a DC signal coupled to said integrator input to thereby determine a timing of a maximum value of said generally parabolically shaped waveform relative to a period of said deflection rate; and,
   means for measuring said timing of said generally parabolically shaped waveform, to generate said DC signal for controlling said timing, thereby maintaining a predetermined timing.

2. The correction waveform signal generator of claim 1, wherein said timing of said maximum value of said parabolically shaped signal is controlled by a polarity of said DC signal input.

3. The correction waveform signal generator of claim 1, wherein said DC signal controls said horizontal timing to advance said horizontal timing of said maximum value.

4. The correction waveform signal generator of claim 1, wherein said DC signal is coupled to form a negative feedback control loop for maintaining said predetermined timing.

5. The correction waveform signal generator of claim 1, wherein an instantaneous magnitude of said generally parabolically shaped waveform causes said integrator to be current limited for a duration representing part of said period.

6. The correction waveform signal generator of claim 5, wherein said measuring means measures said duration of said integrator current limitation.

7. The correction waveform signal generator of claim 6, wherein said measuring means compares said measured duration with a reference potential and generates, responsive to a difference there between, said DC signal.

8. The correction waveform signal generator of claim 7, wherein a voltage divider having a ratio determined by said duration and said period generates said reference potential.

9. The correction waveform signal generator of claim 8, wherein said voltage divider is coupled between power supplies of said integrator.

10. A deflection correction waveform signal generator comprising:
    an integrating amplifier responsive to an AC signal and a DC signal for generating at an output said deflection correction waveform signal, said deflection correction waveform signal having an instantaneous magnitude causing said integrating amplifier to be supply current limited for a time duration representing part of a deflection period;
    said AC signal having a period equal to said deflection period;
    means for monitoring said supply current limitation and generating a pulse signal indicative thereof; and,
    a comparator responsive to said pulse signal and to a reference potential, said DC signal corresponding to a difference between said pulse signal and said reference potential, said DC signal controlling said duration of said supply current limitation.

11. The deflection correction waveform signal generator of claim 10, wherein said comparator comprises a lowpass filter coupled to said pulse signal, and generating therefrom, a potential proportional to a width of said pulse for comparison with said reference potential.

12. The deflection correction waveform signal generator of claim 10, wherein a potential divider generates said reference potential.

13. The deflection correction waveform signal generator of claim 12, wherein said potential divider is coupled between power supplies, having a division ratio equal to a ratio of, a desired duration of said pulse and said predetermined period.

14. The deflection correction waveform signal generator of claim 10, wherein during said duration of said supply current limitation, said deflection correction waveform signal is modified in shape.

15. The deflection correction waveform signal generator of claim 10, wherein said integrating amplifier generates a ramp shaped signal responsive to said DC signal input.

16. The deflection correction waveform signal generator of claim 10, wherein said AC coupled signal comprises a ramp, and said predetermined period corresponds to a period of a horizontal deflection frequency.

17. The deflection correction waveform signal generator of claim 16, wherein said integrating amplifier generates at said output, a horizontal frequency parabolic shaped signal component having a ramp shaped tilt component, wherein these signal components comprise said deflection correction waveform signal.

18. The deflection correction waveform signal generator of claim 17, wherein said DC signal input determines an occurrence of a maximum value of said parabolically shaped signal during said horizontal deflection period.

\* \* \* \* \*